United States Patent [19]
Meier

[11] Patent Number: 5,768,997
[45] Date of Patent: Jun. 23, 1998

[54] PERSON MOVER

[76] Inventor: Fritz Meier, R.R. #1, Bainesville, Ontario, Canada, K0C 1E0

[21] Appl. No.: 625,037

[22] Filed: Mar. 27, 1996

[51] Int. Cl.$^6$ ........................................... B61B 3/00
[52] U.S. Cl. .............................. 104/89; 104/91; 105/148; 105/149.2; 119/14.04
[58] Field of Search .................................. 104/89, 91, 93, 104/94, 95, 106, 116, 137; 105/148, 149.2, 150, 154, 155, 156; 297/344.1, 344.11, 344.12, 344.13; 119/14.03, 14.04

[56] References Cited

U.S. PATENT DOCUMENTS

| | | |
|---|---|---|
| 4,243,147 | 1/1981 | Twitchell et al. . |
| 4,289,076 | 9/1981 | Miller ........................................ 104/89 |
| 4,763,605 | 8/1988 | Braum . |
| 5,119,732 | 6/1992 | Lisy ........................................... 104/91 |
| 5,379,701 | 1/1995 | Sumi et al. ............................... 104/89 |

FOREIGN PATENT DOCUMENTS 2225376  11/1974  France ..................................... 104/89

Primary Examiner—Mark T. Le

[57] ABSTRACT

A person mover for moving a seated dairy farmer from cow to cow in a barn when the cows are arranged in two rows with their rear ends facing each other, the person mover allowing the farmer to milk the cows while seated.

9 Claims, 7 Drawing Sheets

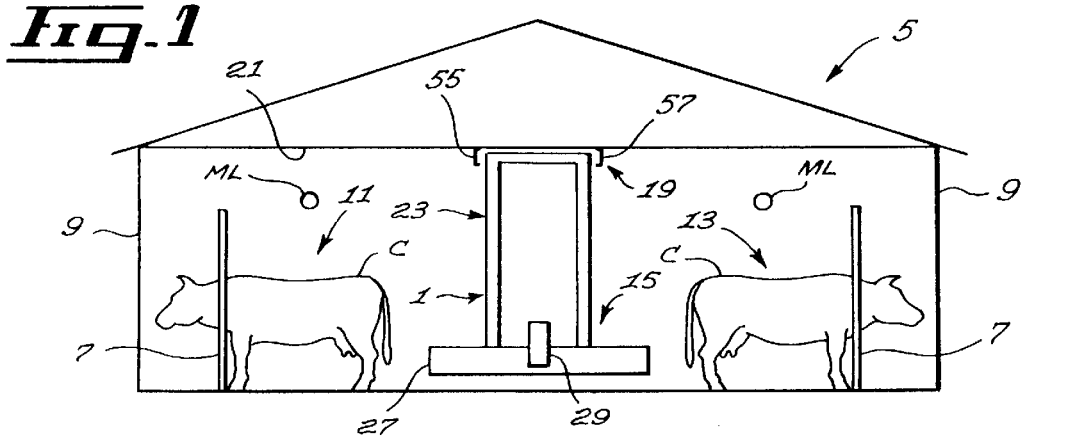
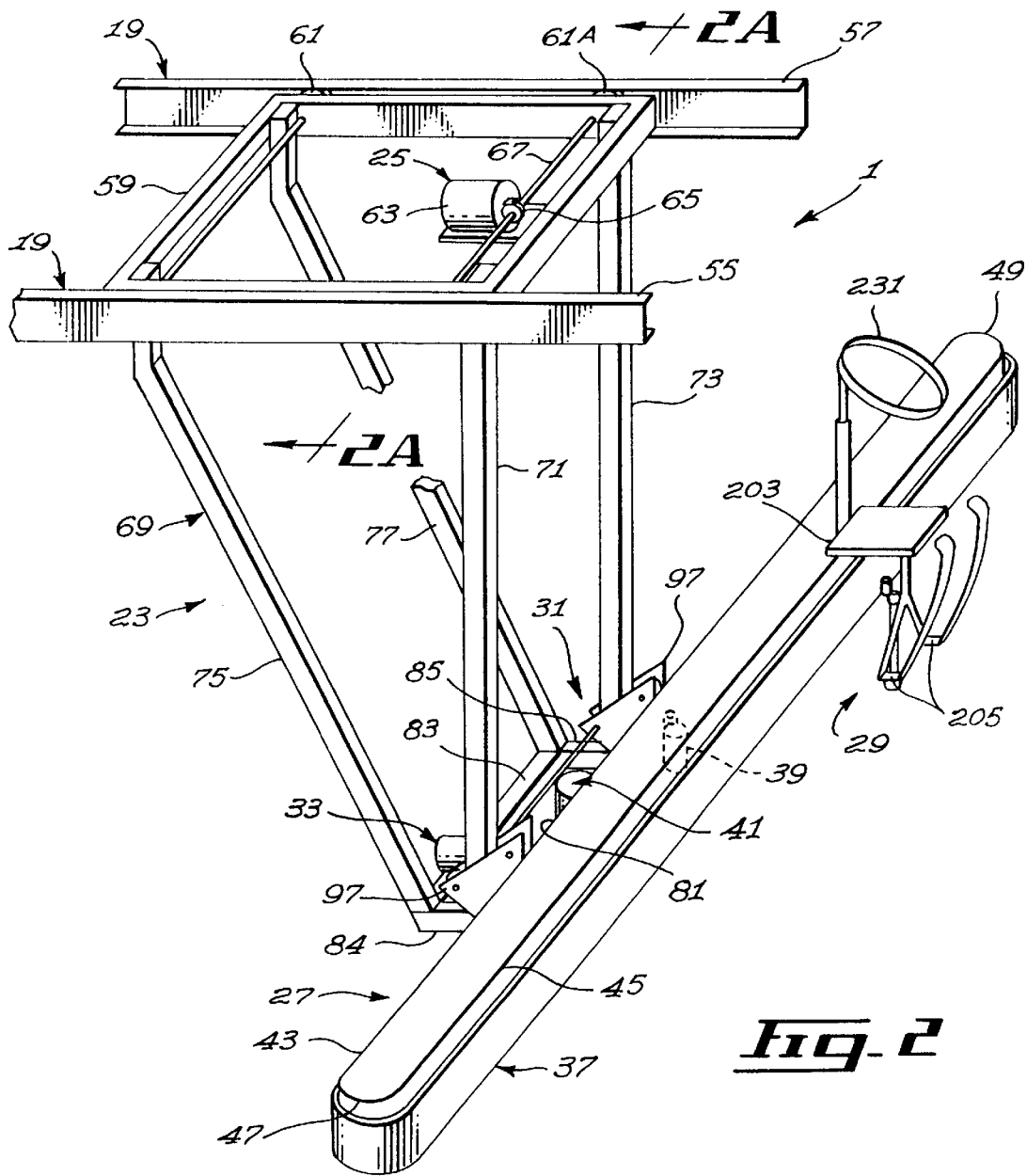

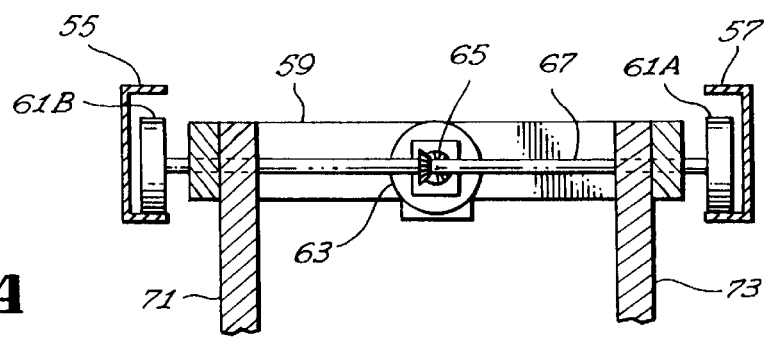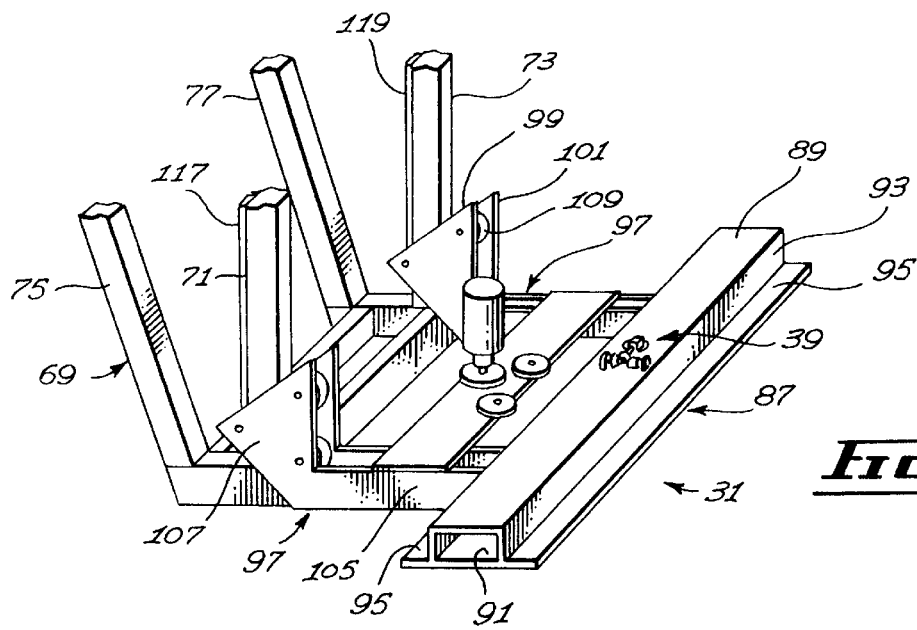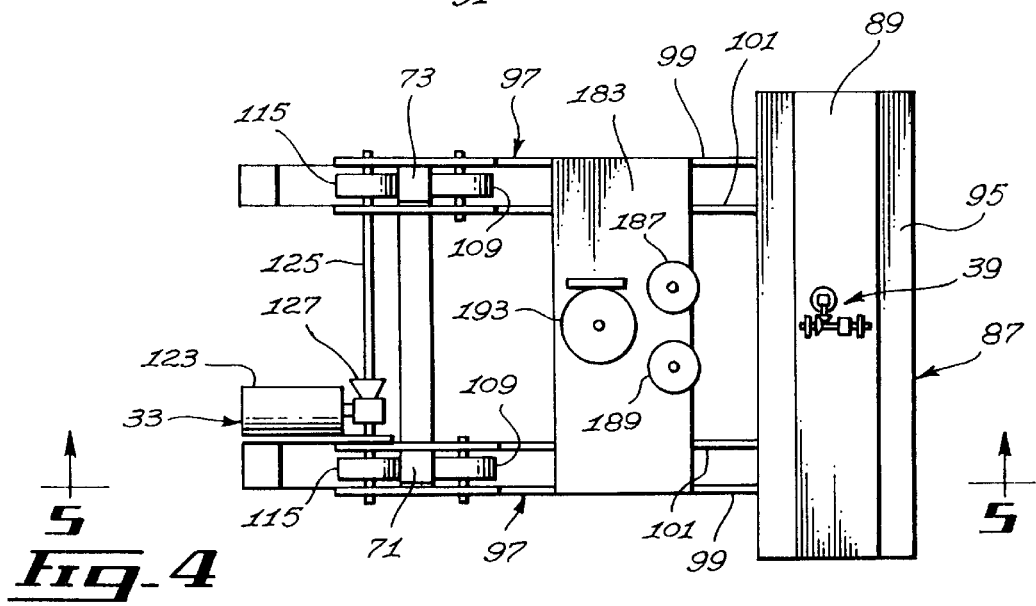

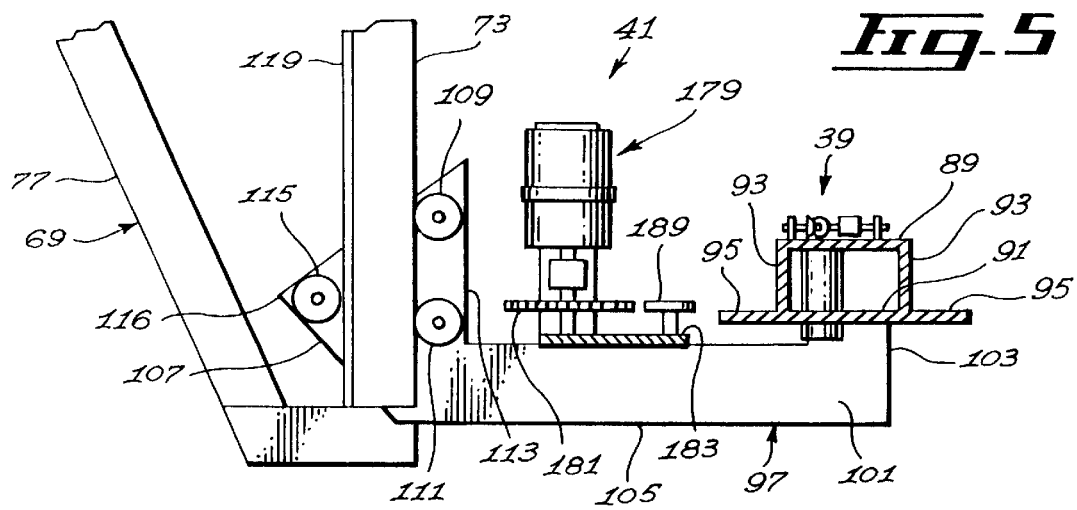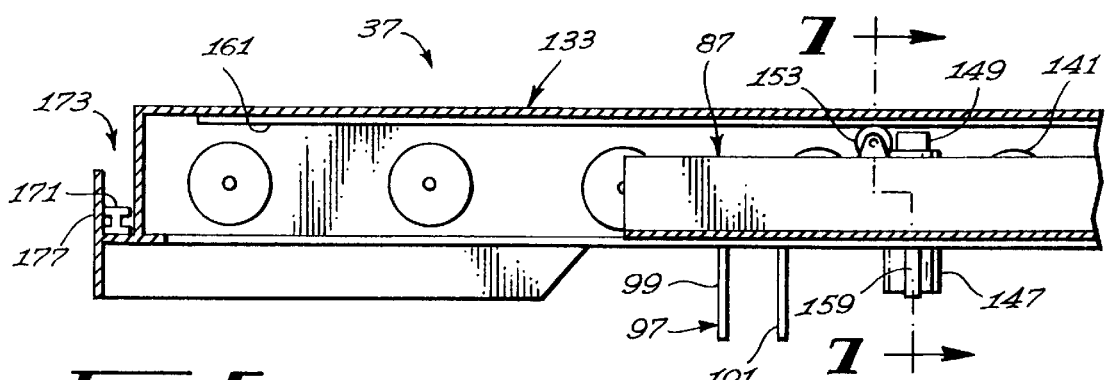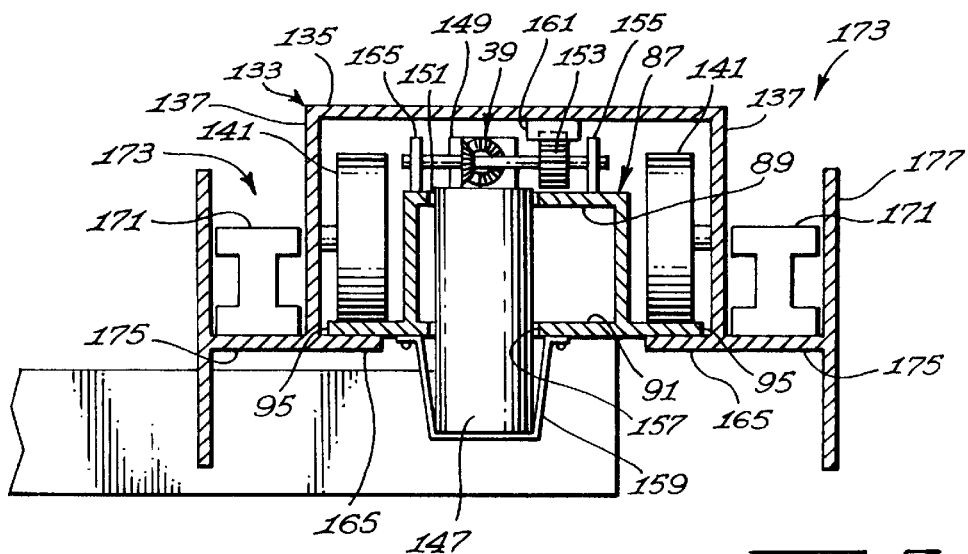

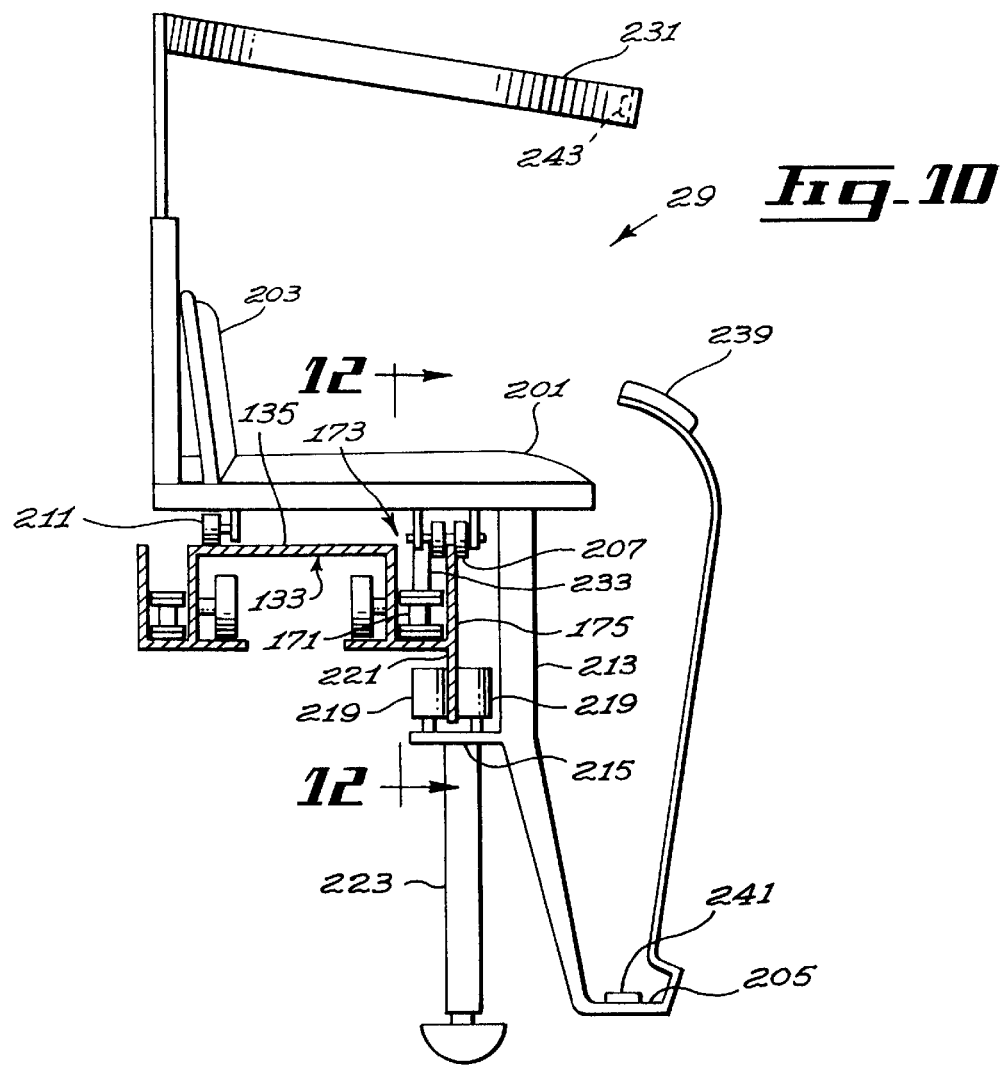
Fig. 10
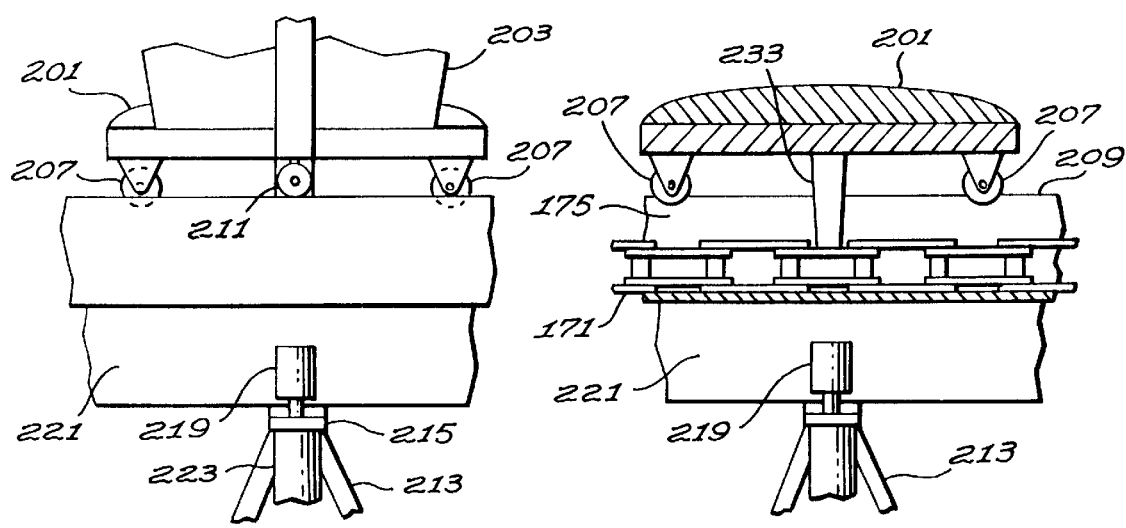
Fig. 11
Fig. 12

Fig. 13
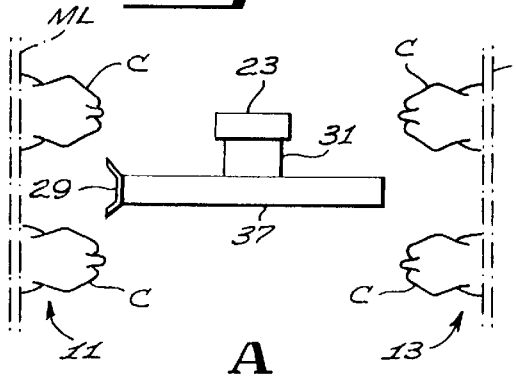
A
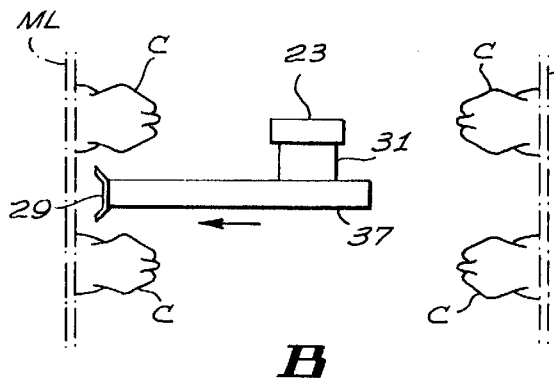
B
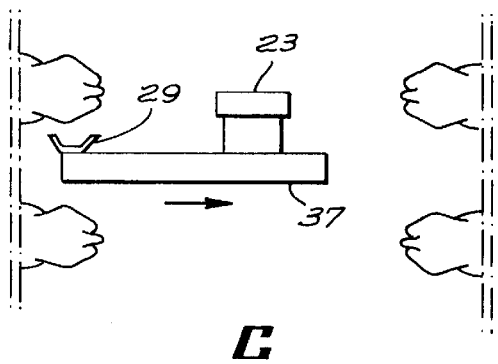
C
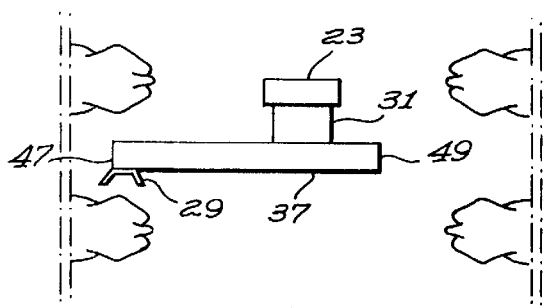
D
Fig. 14
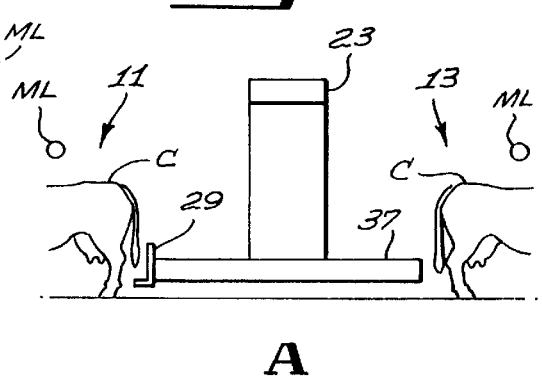
A
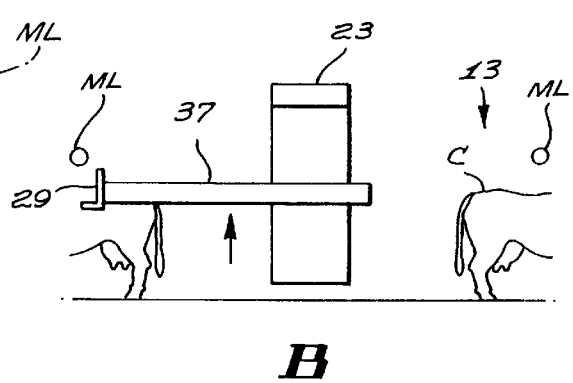
B
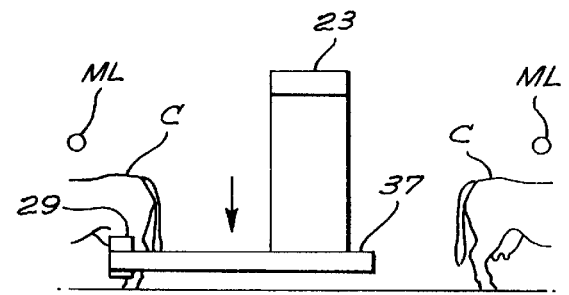
C
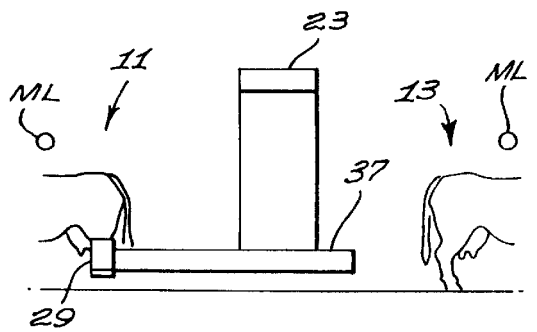
D

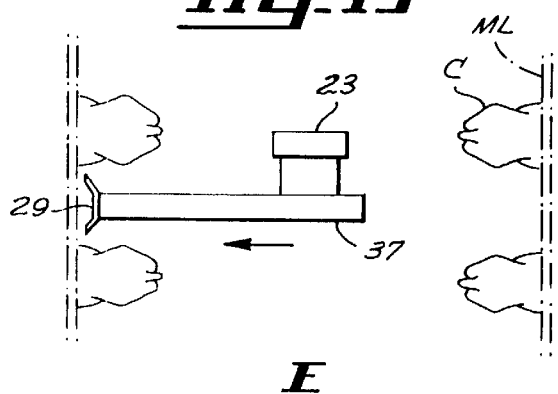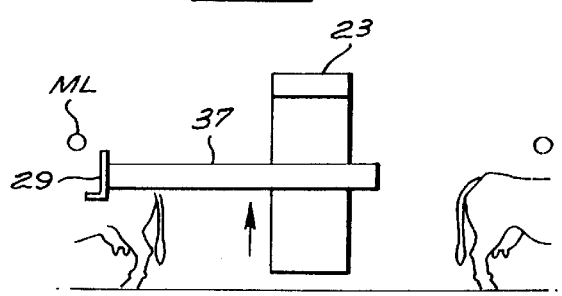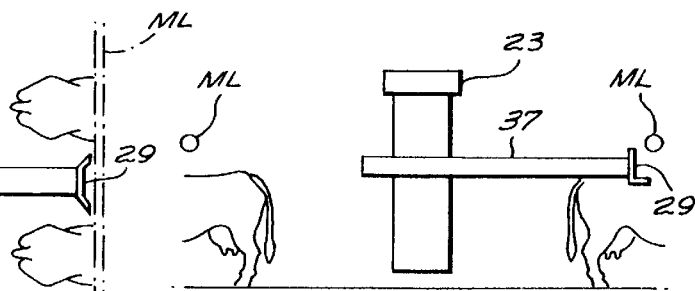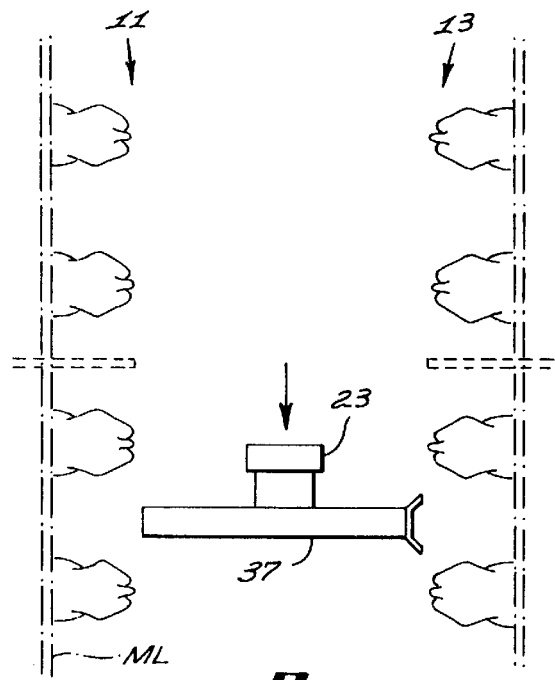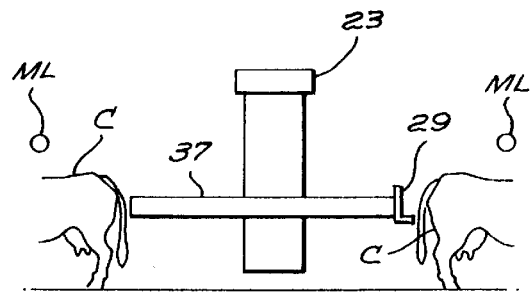

PERSON MOVER

BACKGROUND OF THE INVENTION

1. Field of the Invention

This invention is directed toward a person mover.

The invention is broadly directed toward a person mover for moving a chaired person along a row of work stations so that the person can work at each work station.

The invention is more particularly directed toward a person mover for use in a dairy barn which can move a chaired farmer to each cow in the barn to be able to milk the cows while chaired.

2. Description of Related Art Including Information Disclosed Under 37 CFR §§ 1.97 and 1.98

Milking cows is hard physical work for farmers. The farmer is constantly bending over both to prepare the cow for milking and to attach and detach the milking machine. The cow udders are not conveniently located. In addition the farmer is constantly connecting and disconnecting the milking machine to the milk lines. With a large dairy herd, and with two, or sometimes even three, milkings a day, milking can be quite a demanding chore for the farmer, particularly if he has any kind of a physical problem.

It is known to provide a carriage on which a farmer can sit that can move around a barn and which can position a farmer adjacent each cow to be able to milk it while sitting down. Such a system is shown in U.S. Pat. No. 4,763,605. However this system is very expensive requiring a full basement under the barn and trap doors at each work or milking station.

SUMMARY OF THE INVENTION

It is the purpose of the present invention to provide a person mover that is relatively simple and inexpensive both to build and to operate while still being able to easily move a worker to each or any work station in a row of work stations. It is another purpose of the present invention to provide a person mover that can be easily installed in most existing structures housing work stations without requiring extensive and expensive modifications to the structures.

It is a more specific purpose of the present invention to provide a person mover that is relatively simple and inexpensive, both to build and to operate, and that is particularly suited for use by a chaired farmer to simply and easily milk two parallel rows of cows that are tied to stanchions in a barn with their rear ends facing each other. The person mover of the present invention is simple to install in existing barns with no expensive renovations required. It does not interfere with the normal activity in the barn. It is simple in operation and safe to use. The farmer can remain comfortably chaired during the entire milking operation.

In accordance with the present invention there is provided a person mover having rail means adapted to be mounted between two rows of cows in a barn. The barn is of the type having the stanchions to which the cows are tied located adjacent the sides of the barn so that the rear ends of the cows in one row face the rear ends of the cows in the other row. The rail means are mounted above and between the rows of cows. First carriage means are mounted on the rail means and are movable on the rail means along the rows of the cows. Chair support means are mounted on the first carriage means. The chair support means carries a chair on which the farmer sits, and the chair support means is operable to move the chair to either side of the rail means to position the farmer on the chair adjacent a cow to be milked. Chair moving means are preferably provided on the chair support means to be able to move the chair so that the farmer can milk each cow from either side.

Preferably, the chair support means comprises a second carriage connected to the first carriage and a third carriage, carrying the chair, connected to the second carriage. The second carriage is movable up and down on the first carriage to be able to move the chair up and down. This allows the farmer on the chair to connect and disconnect the milking machine to milk lines which are normally located above the cows in the barn. The third carriage is movable back and forth on the second carriage in a direction transversely to the rail means. This allows the farmer to move in and out between the cows in a row. The chair is also movable on the third carriage from end to end as well so that, together with movement of the second carriage, the farmer can move between the rows.

During operation of the person mover, which will be described in detail later, the seated farmer can move himself inwardly between two cows in one row, and upwardly to a position slightly above the cows so that he can connect the milking machine to the milk line above the cows. He can then move downwardly and outwardly to a milking position facing one of the two cows, milk it, move to a milking position facing the other cow, milk it and then move inward and up again to detach the milking machine from the milk line. He can then lower himself and move across the aisle to the second row of cows, move between the first two cows in this row and repeat the milking operation as for the first two cows in the first row. He then withdraws from the second row, moves down the aisle between the rows to the next pair of cows in the rows and repeats the milking operation, all while comfortably seated.

The invention is particularly directed toward a person mover having rail means adapted to be mounted in a work place with a row of work stations in the work place along at least one side of the rail means. A carriage is mounted on the rail means and means are provided for moving the carriage on the rail means along the row of work stations. Chair support means are mounted on the carriage and a chair is carried by the chair support means. The chair support means is operable to move the chair toward or away from the row of work stations. The carriage and chair support means, together, are able to position a person, on the chair, adjacent a selected work station.

BRIEF DESCRIPTION OF THE DRAWINGS

FIG. 1 is a cross-section view of a dairy barn;

FIG. 2 is a perspective view of the person mover;

FIG. 2A is a detail cross-section view taken along line 2A—2A in FIG. 2;

FIG. 3 is a detail perspective view of the lower portion of the person mover showing the second carriage mounted on the first carriage with the third carriage removed;

FIG. 4 is a top view of FIG. 3;

FIG. 5 is a cross section view taken along line 5—5 in FIG. 4;

FIG. 6 is a partial, longitudinal cross-section view of the second and third carriages;

FIG. 7 is a cross-section view taken along line 7—7 in FIG. 6;

FIG. 10 is a side view, in partial section, showing the chair;

FIG. 11 is a back, detail view of the chair;

FIG. 12 is a cross-section view taken along line 12—12 in FIG. 10; and

FIGS. 13 and 14 are a series of schematic views showing both elevation and plan views of the mover in various milking positions.

DESCRIPTION OF THE PREFERRED EMBODIMENTS

Figure 8:
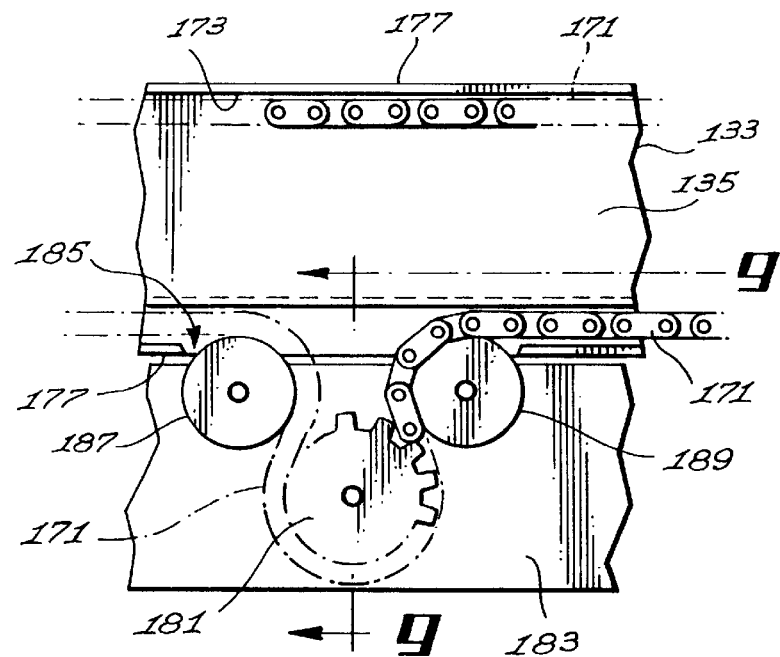
FIG. 8 is a detail plan view showing a portion of the chair moving means.

The person mover 1, as shown in FIG. 1, is used in a dairy barn 5. The dairy barn 5 is of the type having stanchions 7 adjacent the sides 9 of the barn so that when the cows C are tied to the stanchions 7, two rows 11, 13 of cows C are formed with the rear ends of the cows C in one row 11 facing the rear ends of the cows C in the other row 13. The rows 11, 13 of cows C are separated by an aisle 15.

The person mover 1, as shown in FIGS. 1 and 2, has rail means 19 mounted from the ceiling 21 of the barn 5 above the aisle 15 and between the rows 11, 13 of cows. A first carriage 23 is mounted on the rail means 19 and first moving means 25 selectively moves the first carriage 23 back and forth along the rail means. Chair support means 27 are mounted on the first carriage 23. The chair support means 27 carries a chair 29 and is operable to move the chair between the rows of cows. The chair support means 27 includes a second carriage 31 which is movably mounted on the first carriage 23. Second moving means 33 selectively moves the second carriage 31 up and down the first carriage 23. The chair support means 27 also includes a third carriage 37 which is movably mounted on the second carriage 31. Third moving means 39 selectively moves the third carriage 37 back and forth on the second carriage 31 transversely to the rail means 19. The chair 29 is movably mounted on the third carriage 37. Chair moving means 41 selectively moves the chair 29 to one side 43 or the other 45 of the third carriage 37, at each end of the third carriage 37, and also to on e end 47 or the other 49 of the third carriage 37.

In more detail, as shown in FIGS. 2 and 2A, the rail means 19 comprise a pair of parallel rails 55, 57 fastened to the ceiling 21 of the barn. The rails 55, 57 preferably are facing channel members. The first carriage 23 has a base 59 that extends across the rails 55, 57. The base 59 has wheels 61 at its corners that ride on the rails 55, 57. The first moving means 25 that moves the first carriage 23 back and forth along the rails, includes a small, reversible, electric motor 63 connected through a suitable gear connection 65 to an axle 67 joining two of the wheels 61a, 61b. The electric motor 63 is mounted on the base 59. When the wheels 61a, 61b are driven by the motor 63, the first carriage 23 will move along rails 55, 57 between the rows 11, 13 of cows.

The first carriage 23 also has a support frame 69 that extends downwardly from the base 59 to end close to the floor of the barn. The support frame 69 includes two laterally spacedapart, vertical, front posts 71, 73 extending down from the front corners of the base 59 and two rear braces 75, 77 extending down, at and angle, from the rear corners of the base 59 toward the front posts 71, 73. Cross braces 81, 83 extend between the bottom of the rear braces 75, 77 and the bottom of the front posts 71, 73 respectively and tie braces 84, 85 join the front posts and rear braces together. The support frame 69 carries the chair support means 27 as will be described.

The second carriage 31 of the chair support means 27, shown in FIGS. 3 to 5, has a relatively short support beam 87. The support beam 87 is a box beam with a top wall 89, a bottom wall 91, and side walls 93. The bottom wall 91 projects slightly past the side walls 93 forming tracks 95. A pair of spaced apart mounting arms 97 extend transversely from the bottom wall 91 of the beam 87 for use in mounting the second carriage 31 on the support frame 69. The mounting arms 97 are the same so only one will be described in detail. Arm 97 has a pair of parallel, identical plates 99, 101, each plate having a short vertical front section 103, a long relatively thin horizontal section 105 and a rear triangular section 107. The top of the front section 103 is fastened to the bottom wall 91 of the beam 87 by welding or other suitable means. A pair of vertically spaced apart guide rollers 109, 111 are rotatably mounted between the triangular sections 107 of the plates 99, 101 adjacent the front edges 113 of the sections. A sprocket wheel 115 is also rotatably mounted between the triangular sections 107 of the plates 99, 101 adjacent the rear corner 116 of the sections 107 and between the guide rollers 109, 111.

With the sprocket wheels 115 removed, the second carriage 31 is mounted on the first carriage 23 by sliding the lower ends of. the front posts 71, 73 between the triangular sections 107 of the plates 99, 101 on the arms to abut against the guide rollers 109, 111 and then installing the sprocket wheels 115. Each post 71, 73 is held between the guide rollers 109, 111 on one side and the sprocket wheel 115 on the other side. The sprocket wheels 115 cooperate with a rack section 117, 119 on the back of the front posts 71, 73 respectively. The second moving means 33 comprises a small, reversible, electric motor 123 mounted to one of the arm plates 101 and connected to an axle 125 extending between the sprocket wheels 115 by a suitable gear connection 127.

When mounted on the first carriage 23, the second carriage 31 has its support beam 87 in front of the first carriage 23 and extending transverse to the rails 57, 59. Operation of the motor 123 will move the second carriage 31 up and down the posts 71, 73 of the first carriage 23 via the sprocket wheels 115 and the rack sections 117, 119.

The third carriage 37 of the chair support means 27 is movably mounted on the support beam 87 of the second carriage 31. The third carriage 37, as shown in FIGS. 2, 6 and 7, has an elongated channel-shaped chair beam 133 that sits over the support beam 87 and projects well past both ends of the support beam when centered thereon. The chair beam 133 has a top wall 135 and side walls 137. The ends 47, 49 of the beam 133 are rounded. A row of longitudinally spaced-apart wheels 141 are provided on the inner sides of the side walls 137 of the beam 133. The wheels 141 run on the tracks 95 of the support beam 87 guiding and supporting the chair beam 133 for horizontal, longitudinal movement on the support beam 87.

The third moving means 39 for moving the third carriage 37 on the support beam 87 comprises a small, reversible, electric motor 147 mounted within the support beam 87 and rotating, through a suitable gear connection 149 and an opening 151 in the top wall 89 of the beam 87, a drive sprocket 153 mounted between brackets 155 on the top wall 89. The motor 147 can extend downwardly through an opening 157 in the bottom wall 91 of the beam 87, and be mounted on a support 159 connected to the bottom wall. The drive sprocket 153 cooperates with a rack 161 fastened to the underside of the top wall 135 of the chair beam 133 of the third carriage 37. Operation of the motor 147 will move the third carriage 37 back and forth, via the wheels 141, on the support beam 87 of the second carriage 31 in a direction transverse to the rails 57, 59.

For additional guidance and support, the chair beam 133 of the third carriage 37 is preferably provided with inwardly directed flanges 165 at the bottom of the side walls 137 of the beam. The flanges 165 are positioned just under the tracks 95 of the support beam 87 of the second carriage 31, and, along with the wheels 141, help support the third carriage on the second carriage even when the third carriage is extended well to one side or the other of the second carriage.

Figure 9:
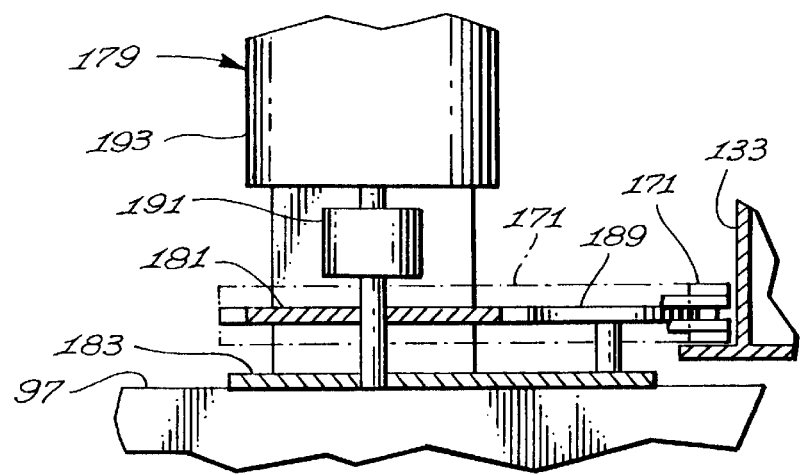
FIG. 9 is a detail cross-section view taken along line 9—9 in FIG. 8.

The chair moving means 41 of the chair support means 27, as shown in FIGS. 8 and 9 includes a chain loop 171 which runs about the chair beam 133 of the third carriage 37 and which is attached to the chair 29. The chain 171 runs about the periphery of the chair beam 133 in a slot 173 formed by an extension 175 of the flange 165 outwardly past the side wall 137 of the chair beam and by vertical rib 177 extending upwardly from the outer edge of the extension 175. Drive means 179 are provided at the back of the chair beam 133 for driving the chain 171. These drive means 179 comprise a drive sprocket 181 mounted behind the chair beam 133 on a mounting plate 183 extending across the arms 97 of the second carriage 31. A gap 185 is formed in the center, rear portion of the vertical rib 177, opposite the drive sprocket 181, and guide sprockets 187, 189 are mounted on the plate 183 adjacent the sides of the gap 185. The chain 171 moves out of the slot 173 and through the gap 185 around one guide sprocket 187, around the drive sprocket 181, back around the other guide sprocket 189 through the gap 185 and back into the slot 173. The drive sprocket 181 is driven, through a suitable gear connection 191, by a small, reversible, electric motor 193 mounted on the plate 183 above the drive sprocket 181. Suitable means (not shown) can be provided for tightening the chain 171 if required by moving the drive sprocket 181 away from the gap 185. On operation of the motor 193 the chain 181 will slide within the slot 173 in one direction or the other depending on the direction of rotation.

The chair 29 is attached to the chain 181 to be moved about the chair beam. The chair 29, as shown in FIGS. 10 to 12 has a seat 201 with a back rest 203 and foot rests 205. Under the approximate center of the seat are two transversely spaced apart guide wheels 207 that ride on the top edge 209 of the rib 175. The the chair beam 133 and slightly above it. A single rear wheel 211 is pivotably mounted at the middle of the rear of the seat 201 to ride on the top wall 135 of the chair beam 133 to maintain the seat generally level. A leg 213 extends down from the bottom front of the seat 201, dividing and carrying the foot rests 205 at its bottom. The leg 213 has a short strut 217 extending rearwardly from its mid-portion. The strut 217 carries a pair of spaced apart rollers 219 with their axis vertical. The rollers 219 roll on either side of a downward extension 221 of the rib 177 to prevent the chair from tipping. A shock absorber 223 can extend downwardly from the bottom of the strut 217 slightly below the foot rests 205. A protective, generally ovoid-shaped ring 231, adjustable vertically, and considerably larger in size than the farmer's head, extends upwardly from the rear of the seat 201. The farmer's head lies within the ring 231 when he is seated. The ring 231 protects the farmer from the cows and provides a head rest against which he can rest his forehead while working if he so desires. A connector bar 233 extends down from beneath the seat 201 to lie within the links of the chain 171. This connector bar 233 connects the chair to the chain 171 so that as the chain 171 moves within the slot 173, the chair will move with it above the slot guided by the rib 175. Leg protectors 237 can extend up from the foot rests 205 to protect the farmer's legs. The leg protectors 237 can cover the farmer's knees and knee pads 239 can be provided on the leg protectors 237 on which the farmer can rest his elbows while milking.

The operation of the person mover 1 is controlled by a set of foot switches 241 on the foot rests 205. The switches can be arranged: to move the chair about the chair beam in one direction or the other; to move the chair beam in one direction or the other; to move the second carriage and thus the chair up or down; and to move the first carriage, and thus the chair, along the aisle. If desired, the switches could move both the chair on the chair beam and the chair beam at the same time to speed up the movement of the chair across the aisle. A power cutoff switch 243 could be provided on the inside of the front of the protective ring 231 to be actuated by the farmer's forehead. Power could be cutoff once the chair 29 is positioned for milking so that no inadvertent movement occurs during milking. While foot switches have been described which free the farmers hands, other types of control means could also be used.

The operation of the person mover will now be described. Using the foot switches 241, the seated farmer causes the first carriage 23 to move along the rail means 19 to a first position between the first two cows in either row as shown in FIG. 13A. During this movement, the second carriage 31 is near the bottom of the first carriage 23 and the third carriage 37 is generally centered in the aisle 15 with respect to the second carriage 31. The chair 29 carrying the farmer can be at one end 47 of the third carriage 37 facing outwardly as shown in FIG. 14A. The milking machine MM can be suspended from the protective ring 231. The third carriage 37 is then moved outwardly to move the farmer between the first two cows of the selected row. At the same time, the second carriage 31 is raised so that the seated farmer can attach the lines of the milking machine MM to the milk line ML above the first row of cows as shown in FIGS. 13B and 14B. After the lines of the milking machine are attached, the second carriage 31 is lowered and the third carriage 37 is slightly withdrawn to position the farmer adjacent the cow's udders. The farmer then moves the chair 29 around the one end 47 of the third carriage 37 to face the first cow and then attaches the milking machine MM to milk the first cow. After milking the first cow, the farmer detaches the milking machine and next moves the chair 29 around the one end 47 of the third carriage 37 to face the second cow in the first row and milks it as shown in FIGS. 13D and 14D. After the second cow is milked, the second and third carriages 31, 37 are operated to raise the farmer toward the milk line ML to disconnect the lines of the milking machine. The third carriage 37 is then moved across the aisle between the two rows to have its other end 49 enter the space between the first and second cows in the second row and at the same time the chair 29 is also moved on the third carriage 37 from the one end 47 to the other end 49. The milking procedure for the first two cows in the first row is repeated for the first two cows in the second row After the first two cows in the second row have been milked, the third carriage 37 is withdrawn from between the two cows in the second row and centered with respect to the second carriage 31 and the first carriage 23 is then moved along the rail means 19 to position the third carriage 37 between the third and fourth cows of both rows. The milking procedure is then repeated as for the first two cows except that the third and fourth cows in the second row instead of in the first row are milked first.

It will be seen that the farmer is required to put little physical effort in the milking operation. All the positioning is carried out mechanically. The equipment can be compactly stored at one end of the barn when not in use. Very little power is required to move the farmer and the milking machine about. The electrical power for the motors can be carried by over head looped lines, as are well known, located between the rails. The lines straighten out as the person mover moves away from its power source and reform into loops when the person mover moves toward the power source.

While the person mover has been described with respect to a dairy barn, it could be used in any work environment where a worker is required to be moved mechanically from work station to work station. The person mover has been described with respect to moving between two rows of work stations but it is obvious that it could also move just one row of work stations. In this case it would not be necessary to move the chair from one end of the third carriage to the other. It may also not be necessary to raise or lower the chair. In a broader sense it may not even be necessary to move the chair about the end of the third carriage.

While one form of moving means for the various carriages and chair have been described other forms of moving means could be used.

I claim:

1. A person mover for installation in a building, the person mover having;
    longitudinal extending overhead rails;
    a first carriage mounted for movement along the rails, the first carriage having vertical guide ways extending downwardly nearly to the floor of the building, and first moving means for moving the first carriage along the overhead rails;
    a second carriage mounted for movement along the vertical guide ways, the second carriage having a horizontal support, and second moving means for moving the second carriage up and down along the vertical guide ways;
    a third, elongated, carriage mounted for horizontal movement along the support of the second carriage in a direction transverse to the rails, the third carriage elongated in the direction of the movement, and third moving means for moving the third carriage along the support;
    and a chair on the third, elongated, carriage.

2. A person mover as claimed in claim 1 including chair moving means on the third carriage for moving the chair from one end of the third, elongated, carriage to the other end.

3. A person mover as claimed in claim 2 wherein the ends of the third elongated carriage are rounded, when viewed from the top, and the chair moving means can move the chair around each end of the third carriage between the front and back of the third carriage to have the chair facing forwardly or rearwardly.

4. A person mover as claimed in claim 1 wherein the third elongated carriage has a long front face extending between short end faces, and means are provided for moving the chair along the front face of the third carriage between the end faces.

5. A person mover as claimed in claim 4 wherein the end faces are rounded and the chair moving means can move the chair around the end faces.

6. A person mover as claimed in claim 4 wherein the third carriage has a rear face parallel to the front face, the end faces joining the front and rear faces being rounded, and the chair moving means can move the chair around each end face between the front and rear faces.

7. A person mover as claimed in claim 6 wherein the chair moving means has an chain loop with means for moving the chain loop about the front, rear and end faces of the third elongated carriage, and means connecting the chair to the chain loop.

8. A person mover for a dairy barn having two parallel rows of stanchions, the stanchions arranged to hold cows in the barn in two rows with their rear ends facing each other; the person mover having: rail means adapted to be mounted in the barn above and between the two rows of cows; a carriage mounted on the rail means; moving means for moving the carriage along the rail means; chair support means on the carriage; a chair carried on the chair support means; the chair support means operable to move the chair to either side of the rail means; the carriage and chair support means, together, able to move a person sitting on the chair to a position alongside a selected cow to be able to milk the cow from the chair; the chair having a vertically adjustable head protective ring.

9. A person mover for a dairy barn having two parallel rows of stanchions, the stanchions arranged to hold cows in the barn in two rows with their rear ends facing each other; the person mover having: rail means adapted to be mounted in the barn above and between the two rows of cows; a carriage mounted on the rail means; moving means for moving the carriage along the rail means; chair support means on the carriage; a chair carried on the chair support means; the chair support means operable to move the chair to either side of the rail means; the carriage and chair support means, together, able to move a person sitting on the chair to a position alongside a selected cow to be able to milk the cow from the chair; the chair having foot rests, and control switches for controlling the person mover mounted on the foot rests.

* * * * *